Jan. 26, 1932. H. C. MORRIS 1,842,419
LOG HAUL CONVEYER AND FEEDING DEVICE
Filed Jan. 11, 1930 2 Sheets-Sheet 1
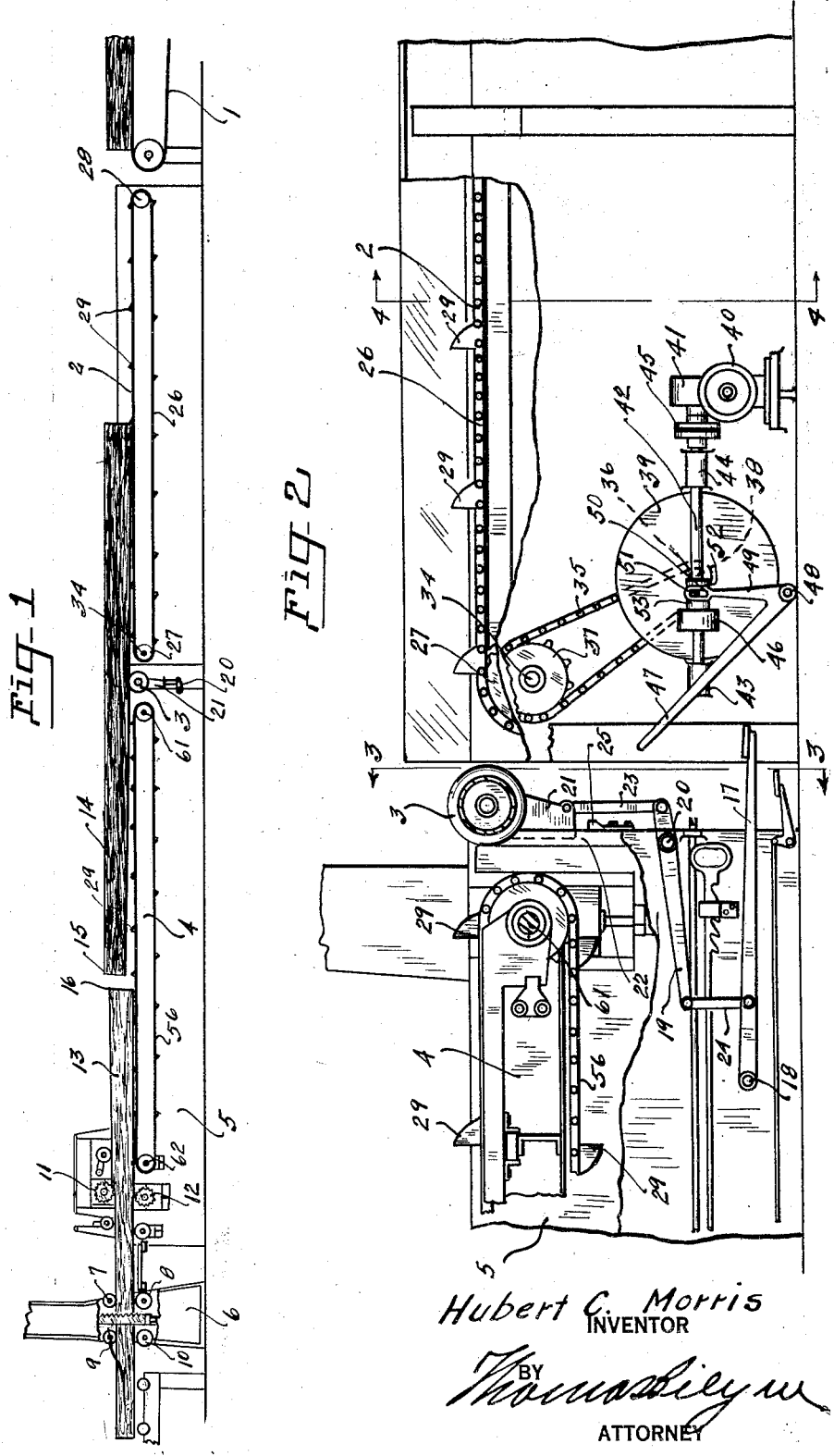
Hubert C. Morris
INVENTOR
BY Thomas Riley
ATTORNEY Jan. 26, 1932.  H. C. MORRIS  1,842,419
LOG HAUL CONVEYER AND FEEDING DEVICE
Filed Jan. 11, 1930  2 Sheets-Sheet 2

Hubert C. Morris
INVENTOR
ATTORNEY

Patented Jan. 26, 1932

1,842,419

UNITED STATES PATENT OFFICE

HUBERT C. MORRIS, OF ALBANY, OREGON

LOG HAUL CONVEYER AND FEEDING DEVICE

Application filed January 11, 1930. Serial No. 420,076.

My present invention relates to my United States Patent 1,747,123 granted February 11, 1930, and is primarily intended as a feeding device for the invention therein embodied.

The primary object of my present invention is to feed logs continuously from the pond to the head rig of a sawmill in order that the total sawing capacity of the head sawing device may be utilized.

Heretofore it has been the general custom in sawmill practice to deliver the logs from the pond to a roll way, and to then deliver the logs from the roll way to the carriage, one at a time. In performing this work a substantial amount of time is required wasted in delivering the log from the roll way to the carriage. During this period of time the head sawing machine is not in sawing operation.

By my new and improved feeding mechanism the logs are placed upon the log haul chain by the pond man and are delivered in a continuous stream line from the log haul chain to the sawmill head rig. The logs are continuously delivered one at a time by an endless conveyer from the log haul to the endless feed, and from the feed to the head rig of the sawmill. A jump roller is disposed within the line of travel of the log which is used when it is desired to speed up the delivery of the log at certain times in order that the log might be delivered in end abutment to the log being sawed by the head rig. The object of this alignment is to supply the head sawing rig with a continuous feed of logs. The operating levers are so arranged as to enable the head sawyer to handle the entire feeding mechanism for the logs disposed between the log haul to the head rig. It is intended that this man is to be the sawyer.

Another object of my invention is to reduce the number of employees working between the pond and the head rig and making the sawyer perform all the incidental functions relative to bringing the logs to the head rig for sawing.

A further object of my invention consists in providing a log feeding device for sawmills that eliminates the use of dogs or other elements which are adapted to engage with the log, and which destroy a part of the lumber content of the log.

A further object of my invention consists in providing a feeding mechanism that may be changed in speed to meet the requirement of the speed at which the log is to be fed through the head rig. When logs of varying diameters are to be fed through the head rig different speeds of feed are required to develop the full cutting capacity of the head rig and therefore the feeding speed of the logs is required to be changed.

Through the use of my new and improved feeding device, the log to be fed to the head rig, may be fed at a speed to develop and contact between the logs being fed into the head rig.

Heretofore logs to be fed to the head sawing machines have been transported over live rolls or over dead rolls so that the log as a whole was moved as each of the projections of the log contacted the rolls.

In my new and improved feeding mechanism, the log reaches a state of equilibrium that is, the log reaches its "lay" when deposited upon the conveyer and it is maintained in this position by gravity and it is actually delivered into the feed rolls of the head sawing rig in that position.

In my new and improved device the blocks forming the cradle upon which the log rests, each present a sloping surface to the travel of the log so that, as the log is speeded up, it does not meet any abnormal resistance in its path of travel. The surface of the cradle blocks upon which the log rests is adapted to intimately engage the surface of the log and to support the log in a stable condition.

Where the logs are being delivered from the pond to the conveyer in a uniform manner and with the small end of the log facing the sawing head rig, I have provided means that may be utilized for placing the ends of the logs, one with the other and thereby obtain a continuous stream of logs without the use of rolls of any kind. When a break has occurred in the line of delivery of the logs, the logs may be speeded up by increasing the speed of the conveyer upon which they are lying until the gap is closed and a continuous end to end engagement of the logs to be delivered into the sawing machine is effected.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings:

Fig. 1 is a side view of my new and improved device, shown as being disposed between the head rig and the log haul that brings the log from the pond to the feeding device.

Fig. 2 is a fragmentary, sectional, side view of the entrance end of the sawmill and of the delivery end of the feeding device and illustrating a jump roller disposed therebetween.

Like reference characters refer to like parts throughout the several views.

Figure 3:
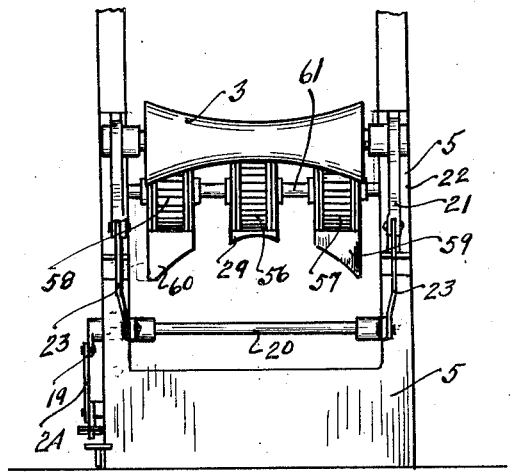
Fig. 3 is an end view of the sawmill, the same being taken on line 3—3 of Fig. 2, looking in the direction indicated.

1 is the endless conveyer, commonly called the bull chain which forms the log haul, that delivers the log from the pond to the endless feeding conveyer. The endless feeding conveyer is shown at 2 which is in registerable alignment with bull chain 1. A jump roller 3 is disposed between the endless feeding conveyer 2 and the conveyer 4 that is disposed upon the head rig 5. The head rig 5 preferably has a gang saw 6 associated therewith and which has pairs of feed rollers 7, 8, 9 and 10. Top and bottom slabbing heads 11 and 12 are disposed within the sawmill device and upon rig 5. My feeding mechanism is primarily illustrated in Fig. 2. The log 13 is illustrated in Fig. 1 as being partly through the gang saw, within the slabbing heads and partly on the conveyer 4. The log 14 is shown as resting partly upon the jump roller 3 with the end 15 out of contact with the end 16 of the log 13 and partly on the feeding conveyer 2.

One of the objects of my device is to contact the ends 15 and 16 of the adjacent logs in order that the full sawing capacity of the head rig may be developed. The sawyer stands at a convenient location in order that the various levers as illustrated in Fig. 2 may be manipulated. The jump roller 3 may be raised and lowered by any suitable mechanism. Air, steam or electric operation for the larger logs may be used, and it may be manually manipulated for smaller logs.

Figure 5:
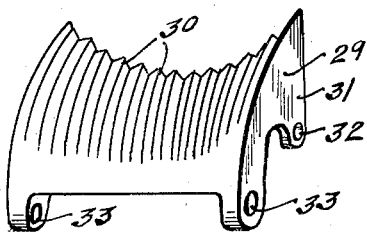
Fig. 5 is a perspective, end view of one of the cradle blocks that is disposed upon the endless feeding conveyer and upon which the log actually rests when being conveyed.

I have here shown a manual manipulation for the jump roll. The foot lever 17 is journaled about any suitable journal support 18 and a secondary lever 19 is journaled about a supporting journal pin 20. The jump roller 3 is mounted upon a supporting head 21 and the head is adapted for being raised and lowered upon a suitable guide way 22. A link 23 is disposed between the head 21 and one end of the lever 19 and a link 24 is disposed between the foot lever 17 and the lever 19. A stop 25 limits the downward movement of the block 21. The logs are preferably fed into the head sawing device with the small end of the log entering the head rig. The log from the bull chain 1 is delivered upon the endless conveyer 2. The endless conveyer 2 is formed of a chain 26 that passes about sprockets 27 and 28. Cradle blocks 29 as illustrated in Fig. 5 are disposed in spaced relationship upon the chain. The cradle blocks form segments of circles on their log engaging side and have a corrugated surface 30. The corrugations 30 form knife edges upon the forward end by the wall 31 being substantially at right angles to the periphery of the corrugated surface. Each of the cradle blocks are rigidly secured to the chain as by having at least two fastenings disposed at either end of the cradle block to fasten the same to the chain links, the fastenings being made by any suitable fastening means as by the passing of rivets or bolts through the holes 32 and 33, and through the chain links. The sprocket 27 about which the endless conveyer passes is the driving sprocket and the same is fixedly disposed upon the driving shaft 34. The driving shaft 34 is rotated by any suitable driving means as by being driven by a drive chain 35. The drive chain 35 is trained about a driving sprocket 36 and the driven sprocket 37. The driving sprocket 36 is disposed upon the shaft 38 and the friction disc 39 is also secured to the shaft 38. A prime mover as an electric motor 40 is provided having a speed reducer 41 associated therewith. The speed reducer 41 indirectly drives a shaft 42. The shaft 42 is journaled within the bearing blocks 43 and 44 with a flexible connection 45 being disposed between the shaft and the speed reducer. A friction wheel 46 is slidably disposed upon the shaft 42 and is adapted for being driven thereby. A hand lever 47 is disposed conveniently for the operator of the assembly and is pivotally disposed about a supporting shaft 48. An arm 49 has a slot 50 disposed therein that engages a pin 51 that is disposed upon a ring 52 disposed upon the hub 53 of the friction wheel 46. The friction wheel 46 is in driving engagement with the disc 39 and the location of the friction wheel 46 relative to the face of the disc 39 determines the speed by which the shaft 38 will be driven and thereby the peripheral speed of the conveyer chain 26. When the log 14 engages the jump roller 3 the jump roller is raised sufficiently to raise the small end of the log clear off of the conveyer 4 of the head sawing rig and the log is then speeded up sufficiently to require the ends 15 and 16 to contact each other in order that the logs may be fed continuously through the head rig. When the ends have been contacted with each other the jump roller 3 is then lowered and the log will then be fed by the conveyer in end engagement with the log then being fed through the head sawing rig.

Figure 4:
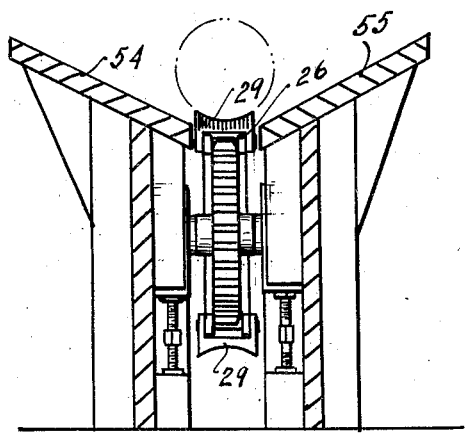
Fig. 4 is a sectional, end view of the feeding mechanism, the same being taken on line 4—4 of Fig. 2 looking in the direction indicated.

Referring to Fig. 4, the endless conveyer to which the cradle blocks 29 are secured in spaced relationship runs longitudinally of a slip that has side walls 54 and 55 disposed at oppositely disposed sides of the endless transfer. The log rests directly upon the cradle blocks and as the log reaches a state of equilibrium within the cradle blocks the "ride" of the log will be developed before the log reaches the head sawing rig.

Likewise the endless conveyer 4, that delivers the log directly to the slabbing heads 11 and 12, is composed of a central endless transfer conveyer 56 upon which the cradle blocks 29 are disposed in spaced relation. Secondary endless conveyers 57 and 58 are disposed parallelly to the central conveyer 56, each of which have cradle blocks 59 and 60 disposed thereupon and in spaced relationship with each other. Means are provided upon the sawing machine for moving the secondary endless conveyers laterally upon the shafts 61 to which the same are secured. The purpose of this is to form a cradle for supporting the log therein. However, it has been my experience that where the cradle blocks forming the central transfer conveyer are made substantial in length the log may be entirely carried throughout its line of travel by permitting the same to rest directly upon the central cradle blocks only.

I have herein disclosed a method for the continuous sawing of logs wherein the log is delivered from the pond upon the log haul and the same then being carried continuously in line alignment to the head sawing rig without having been offset or placed out of alignment from the log pond to the head sawing rig. This method of handling logs may be carried out by the mechanism herein above described or by any other suitable means.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow.

What I claim is:

1. In a device of the class described, the combination of a log haul endless conveyer, settable means for predetermining the conveying speed of the conveyer, an endless saw feed conveyer, and a jump roller disposed between the log haul conveyer and the saw feed conveyer and being in the normal line of travel of the log being conveyed by the conveyer.

2. In a device of the class described, the combination with a log haul endless conveyer and a main saw rig, power means for varying the speed of the log haul conveyer, an endless saw feed conveyer disposed in the line of travel of the logs and adjacent the main saw rig, and a jump roller disposed in the normal travel of the logs between the log haul conveyer and the saw feed conveyer.

HUBERT C. MORRIS.